United States Patent
Jensen

(10) Patent No.: US 6,911,799 B2
(45) Date of Patent: Jun. 28, 2005

(54) STRAPPING MACHINE WELD MOTOR CONTROL SYSTEM

(75) Inventor: Roy J. Jensen, Pleasant Prairie, WI (US)

(73) Assignee: Illinois Tool Works, Inc., Glenview, IL (US)

( * ) Notice: Subject to any disclaimer, the term of this patent is extended or adjusted under 35 U.S.C. 154(b) by 0 days.

(21) Appl. No.: 10/423,221

(22) Filed: Apr. 25, 2003

(65) Prior Publication Data

US 2004/0212337 A1 Oct. 28, 2004

(51) Int. Cl.[7] .................................................. G05B 1/06
(52) U.S. Cl. ............................... 318/652; 318/6; 318/9; 318/10; 100/26; 100/32
(58) Field of Search ...................... 318/6, 9, 10, 652, 318/671; 53/589, 588; 100/26, 29, 32

(56) References Cited

U.S. PATENT DOCUMENTS

| | | | | |
|---|---|---|---|---|
| 4,093,146 A | * | 6/1978 | Haley | 242/471 |
| 4,712,357 A | * | 12/1987 | Crawford et al. | 53/450 |
| 4,912,912 A | * | 4/1990 | Tagomori | 53/589 |
| 5,287,802 A | * | 2/1994 | Pearson | 100/4 |
| 5,333,438 A | * | 8/1994 | Gurak et al. | 53/399 |
| 5,560,187 A | * | 10/1996 | Nagashima et al. | 53/589 |
| 6,532,722 B2 | * | 3/2003 | Gerhart et al. | 53/589 |
| 6,640,700 B2 | * | 11/2003 | Helland et al. | 100/26 |

* cited by examiner

Primary Examiner—Rina Duda
(74) Attorney, Agent, or Firm—Mark W. Croll, Esq.; Donald J. Breh, Esq.; Welsh & Katz, Ltd.

(57) ABSTRACT

A control system for a weld motor for a strapping machine is based upon the number of rotations of the weld motor. The system is used in a strapping machine of the type having a body, an anvil mounted to and movable relative to the body, a sealing member disposed for oscillating movement relative to the anvil and a motor operably connected to the sealing member to provide oscillating movement to the sealing member. Movement of the sealing member seals overlying courses of strapping material to one another. The control system includes a sensed element located on a rotating portion of the motor, a sensor for generating a signal at each instance of sensing the sensed element, a counter operably connected to the sensor for counting the instances of the sensed element and a controller for controlling operation of the motor based upon the counting of the instances of the sensed element. A method for controlling a motor is also disclosed.

6 Claims, 1 Drawing Sheet

STRAPPING MACHINE WELD MOTOR CONTROL SYSTEM

BACKGROUND OF THE INVENTION

The present invention is directed to a weld motor control system. More particularly, the present invention is directed to a weld motor control system for a strapping tool or strapping machine that provides a consistent weld or joint strength regardless of weld motor voltage fluctuations.

Strapping tools or machines are well known in the art. Typically these machines are used for securing straps around loads. One type of strapper is used with a plastic or polymeric strap and is a stationary arrangement in which the strapper is included as part of an overall manufacturing or packaging system.

A strapping or welding head is provided as part of a strapping machine and provides a number of functions. First, the strapping head includes a gripper having one or more gripper portions that grip the strap during the course of a strapping operation. The strapping head also includes a cutter to cut the strap from a strap source or supply. Last, the strapping head includes a sealer to seal an overlying course of strapping material onto itself. This seal is commonly referred to as a weld and is effected by heating overlying courses of the strap by use of a vibrating element.

To effect the seal or weld, an anvil is maintained rigidly against one of the courses of strap and a vibrating element oscillates or vibrates against the other course of strap, thus creating friction and heat to effect the weld. The vibrating element is driven by a motor that is mounted to the body and operably connect to the vibrating element. In a typical weld motor arrangement, the weld cycle is controlled by time. That is, the weld cycle is a time dependent cycle, typically timed or controlled by either an electric timing circuit or a pneumatic timing circuit.

It has, however, been found that the weld motor voltage can decrease during the weld cycle as much as 3 percent to 4 percent in addition to a 10 volt fluctuation in the power feed, commonly experienced. Moreover, this voltage decrease has been correlated to lower joint strength because the motor speed decreases as the voltage decreases. In an effort overcome the lower joint strength, longer weld times were used. However, it was found that when longer weld times were used in a cycle in which the voltage did not drop, the strap integrity could be, in certain instances, compromised.

Accordingly, there exists a need for a simplified weld motor control system for a welding or strapping head for use in a strapping machine. Desirably, such a control system eliminates the dependence upon time as the controlling factor for the weld cycle. More desirably, such a control system serves to provide a consistent strap weld, regardless of fluctuations in the weld motor voltage. Most desirably, such a control system is readily adapted to existing strapping machine strapping head systems.

BRIEF SUMMARY OF THE INVENTION

A control system for a weld motor for a strapping machine includes a sensor and a sensed element located on a rotating portion of the motor. The sensor senses rotation of the motor and generates a signal for control of the motor. Such a control system is used for controlling the weld motor of a strapping machine of the type having a body, an anvil mounted to and movable relative to the body, a sealing member disposed for oscillating movement relative to the anvil and a motor operably connected to the sealing member to provide oscillating movement to the sealing member.

Such a control system eliminates the dependence upon time as the controlling factor for the weld cycle and serves to provide a consistent strap weld, regardless of fluctuations in the weld motor voltage. Because of its simplicity, the present control system is readily adapted to existing strapping machine strapping head systems.

In a present embodiment, the sensed element is an indicia or marking present on a shaft of the motor and the sensor is a proximity sensor. positioned near the marking. A counter receives pulses or signals from the sensor for each sensed occurrence of the sensed element. A controller receives a signal from the counter to control the motor based upon a predetermined number of sensed occurrences.

The generated signal can stop rotation of the motor or commence rotation of the motor. A present control system includes a power relay disposed between the controller and the motor. The controller signal is received by the power relay to generate a signal to control the motor. A method for controlling the motor is also disclosed.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
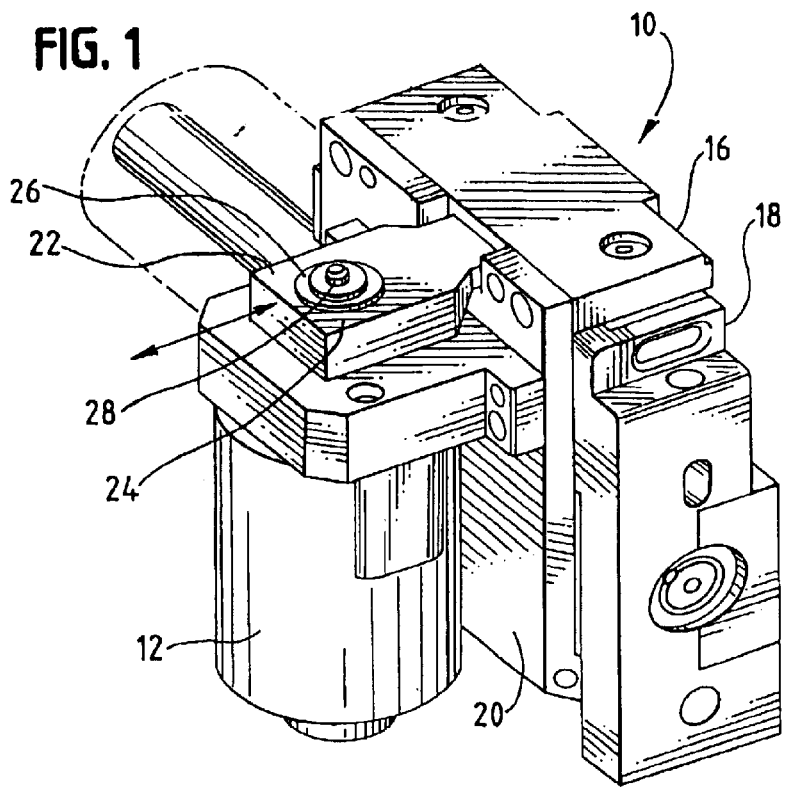
FIG. 1 illustrates an exemplary strapping machine weld head.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular FIG. 1, there is shown a conventional strapping machine weld head 10, exemplary of which is that disclosed in Gerhart et al., U.S. Pat. No. 6,532,722, which patent is commonly assigned with the present application and is incorporated herein by reference. The weld head 10 includes a weld motor 12 that is controlled by a control system 14 embodying the principles of the present invention.

The weld head 10 includes an anvil 16 that is movably mounted to the strapping head body 18. In a current embodiment, the anvil 16 is fixedly mounted to a side plate 20 that moves relative to the body 18. A sealing member, such as the illustrated vibrating member 22 is disposed in the anvil 16 and includes a welding end having a weld pad or weld region (not shown) and a coupling end 24.

The weld motor 12 is operably connected to the vibrating member 22 at the coupling end 24 to effect the necessary vibrations or oscillations of the member 22. In a current embodiment, the motor 12 is mounted to the body side plate 20 and is thus fixedly mounted relative to the anvil 16 and vibrating member 22.

To effect oscillation of the vibrating member 22, the motor 12 includes an eccentric drive element 26 (mounted to a non-eccentric shaft 34), such as the exemplary eccentric shaft portion extending through a receiving opening (not shown) in the vibrating member coupling end 24. A bearing 28 is mounted to the shaft eccentric 26. The eccentric 26 is configured such that an axis of rotation is off-center of the shaft 34 axis.

Figure 2:
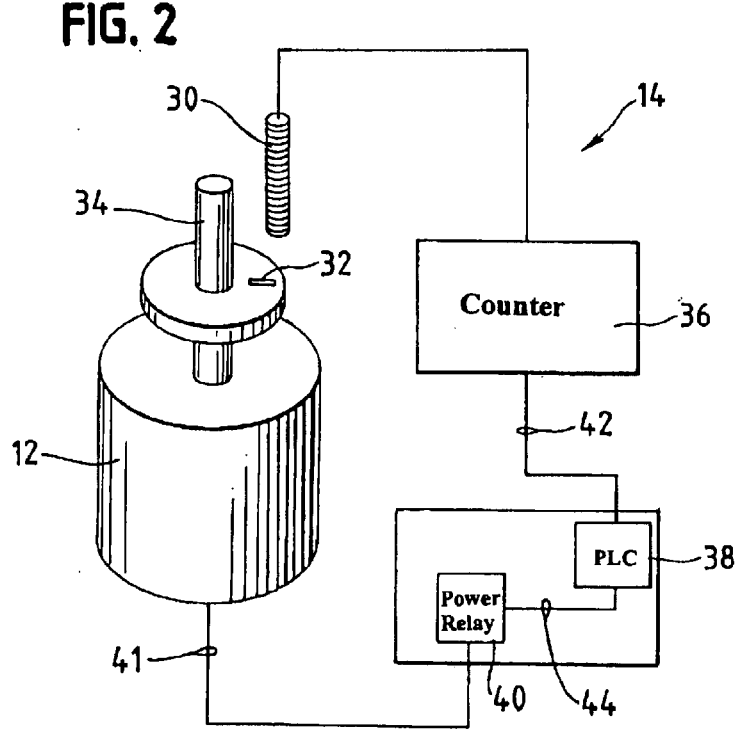
FIG. 2 is a schematic illustration of a control system for a weld head motor embodying the principles of the present invention.

Referring to FIG. 2, the motor 12 is controlled by a control system 14 that, instead of timing the weld cycle, monitors or counts the number of revolutions of the motor 12. Thus, even if the voltage of the weld motor 12 varies (i.e., drops upon actuation and due to supply voltage fluctuations), the total number of rotations of the motor 12 (and thus the number of vibrations or strokes of the vibrating member 22) remains constant.

In a current embodiment, the control system 14 includes a sensor 30, such as a proximity sensor and a target 32 or like sensed element on the motor shaft 34. The sensor 30 is operably connected to a counter 36 (such as the illustrated counter display) which is in turn operably connected to a programmable logic controller (PLC) 38 or like programmable element. The PLC 38 is operably connected to a power relay 40 that supplies power to or isolates power from the weld motor 12 through a power feed 41.

In a preferred embodiment, the counter 36 is programmable so that the preset value (e.g., the preset number of rotations) can be changed, and the counter 36 provides a control signal (as at 42) to the PLC 38 which signal is triggered when the preset revolution value (i.e., count) is reached. The PLC 38 provides a control on/off signal (as at 44) to the power relay 40.

It is anticipated that the counter 36 can be removed (and the sensor 30 directly providing a control signal to the PLC 38) so long as the PLC 38 has a sufficiently fast input to accurately count the proximity sensor pulses. Those skilled in the art will recognize the various means in which "counting" the number of rotations can be achieved, which other means are within the scope and spirit of the present invention.

Several tests were conducted to determine the strength of a weld when the weld was made by: (1) a timed circuit; (2) a timed circuit with dynamic braking control; (3) motor rotation counts; and (4) motor rotation counts with dynamic braking. Each of the tests was conducted with varying weld motor voltages. In those tests that were conducted without dynamic braking the motors were allowed to coast down to a stop. In those tests that were conducted with dynamic braking, the motors were stopped using appropriate circuitry. All of the strap samples were ¾ inch wide, 0.060 inch thick polyester strap.

In the data that follows, the strap weld times were varied from 0.45 seconds to 0.65 seconds (at varying voltages), with results shown in TABLE 1; weld time was held constant (at varying voltages) with dynamic braking, with the results shown in TABLE 2; strap weld times were measured by the number of motor rotations (at varying voltages) without dynamic braking, with the results shown in TABLE 3; and by the number of motor rotations (at varying voltages) with dynamic braking, with the results shown in TABLE 4.

TABLE 1

JOINT STRENGTH WITH VARYING WELD TIMES AND WELD MOTOR VOLTAGES

| Weld Time (secs.) | Voltage (VAC) | Avg. Joint Strength (pounds) | Minimum Joint Strength | Total Avg. Counts | Number of Samples |
|---|---|---|---|---|---|
| 0.45 | 124.6 | 2313.9 | 2150 | 195.80 | 20 |
| 0.45 | 121.5 | 2323.5 | 2133 | 194.90 | 30 |
| 0.45 | 108.6 | 2236.8 | 2002 | 173.80 | 30 |
| 0.45 | 100.5 | 2004.6 | 1740 | 162.73 | 30 |
| 0.55 | 108.8 | 2256.9 | 2049 | 191.35 | 20 |
| 0.65 | 108.8 | 2363.1 | 2204 | 212.00 | 20 |

TABLE 2

JOINT STRENGTH WITH CONSTANT WELD TIMES AND VARYING WELD MOTOR VOLTAGES, WITH DYNAMIC BRAKING

| Weld Time (secs.) | Voltage (VAC) | Avg. Joint Strength (pounds) | Minimum Joint Strength | Total Avg. Counts | Number of Samples |
|---|---|---|---|---|---|
| 1.10 | 121.5 | 2343.2 | 2271 | 223.40 | 30 |
| 1.10 | 108.3 | 2340.8 | 2149 | 194.57 | 30 |
| 1.10 | 100.3 | 2273.2 | 1866 | 175.07 | 15 |

TABLE 3

JOINT STRENGTH WITH CONSTANT WELD MOTOR ROTATIONS AND VARYING WELD MOTOR VOLTAGES, WITHOUT DYNAMIC BRAKING

| Motor Rotation Counts | Voltage (VAC) | Avg. Joint Strength (pounds) | Minimum Joint Strength | Total Avg. Counts | Number of Samples |
|---|---|---|---|---|---|
| 155 | 119.3 | 2354.8 | 2253 | 204.27 | 15 |
| 155 | 106.5 | 2287.6 | 2094 | 192.07 | 15 |
| 155 | 100.6 | 2231.3 | 1973 | 188.93 | 15 |

TABLE 4

JOINT STRENGTH WITH CONSTANT WELD MOTOR ROTATIONS AND VARYING WELD MOTOR VOLTAGES, WITH DYNAMIC BRAKING

| Motor Rotation Counts | Voltage (VAC) | Avg. Joint Strength (pounds) | Minimum Joint Strength | Total Avg. Counts | Number of Samples |
|---|---|---|---|---|---|
| 155 | 119.3 | 2388.1 | 2272 | 162.80 | 15 |
| 155 | 108.5 | 2359.5 | 2114 | 162.47 | 15 |
| 155 | 100.3 | 2315.3 | 1840 | 161.80 | 15 |
| 190 | 119.3 | 2367.9 | 2216 | 191.87 | 15 |
| 190 | 108.5 | 2401.3 | 2324 | 197.67 | 15 |
| 190 | 100.3 | 2377.8 | 2264 | 196.60 | 15 |

Referring to the data of TABLE 1, it can be seen that when weld time is controlling, the weld strength is clearly affected by the weld motor voltage. At a weld time of 0.45 seconds, the average joint strength varied from 2004.60 pounds at a voltage of 100.5 VAC to 2323.5 pounds at a voltage of 121.5 VAC. The average strength actually dropped (about 9.6 pounds) from 121.5 VAC to 124.6 VAC. However, the data trend clearly shows a decrease in joint strength with decreased voltage. It is also seen that the average and minimum joint strength (at low motor voltage operation) can be increased by increasing the weld time. The data further shows a correlation between reduced strength and a reduction in the total average counts or motor revolutions per weld. However, it was also noted that at increased weld times (i.e., at 0.65 seconds), some of the strap samples showed significant amounts of molten plastic which made it difficult to pull the strap samples out of the weld head.

The data of TABLE 2 shows that greater control can be obtained by the use of dynamic braking. However, again, the average and minimum strengths continued to decline with decreased voltages.

The data of TABLE 3 shows that the average and minimum joints strengths are better controlled when the number of rotations of the motor controls the weld cycle. However, again, when there is a higher voltage, the strength appears also to increase, however less than as shown in the previous data. It is believed that this is due to an increase in coast down time with higher voltages.

TABLE 4 shows that when the number of rotations of the motor controls, along with dynamic braking, the joint strength can be quite well controlled and maintained at a level higher than a pre-established threshold value. As seen in TABLE 4, when the number of motor rotations is set at 190, even with variations in voltage between 100.3 VAC and 119.3 VAC (variations of almost 20 percent in voltage), the average joint strength varies less than 1.5 percent (33.4 pounds). Thus, the data clearly shows that regardless of motor voltage fluctuations (within reason, of course), by monitoring and setting the weld cycle based upon the number of rotations of the motor and by using dynamic braking (i.e., stopping the motor rather than allowing it to coast down), the weld joint strength can be well controlled with a high level of confidence and with a high level of assurance of the joint integrity.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A control system for a weld motor for strapping machine, the strapping machine being of the type having a body, an anvil mounted to and movable relative to the body, a sealing member disposed for oscillating movement relative to the anvil and a motor operably connected to the sealing member to provide oscillating movement to the sealing member to seal overlying courses of strapping material to one another, the control system comprising:

a sensor, wherein the sensor is a proximity sensor; and a sensed element, wherein the sensed element is an indicia present on a shaft of the motor, wherein the sensor senses rotation of the motor and generates a signal for control of the motor.

2. The control system in accordance with claim 1 wherein the generated signal stops rotation of the motor.

3. The control system in accordance with claim 1 including a counter, wherein the sensor provides a signal to the counter for each sensed occurrence of the sensed element, and including a controller, wherein the counter generates a signal to the controller and wherein the controller generates a signal to control the motor.

4. The control system in accordance with claim 3 including a power relay disposed between the controller and the motor, wherein the controller signal is received by the power relay to generate a signal to control die motor.

5. The control system in accordance with claim 3 including circuitry to stop the motor upon receipt of the signal to control the motor.

6. The control system in accordance with claim 3 including circuitry to stop the motor upon loss of the signal to control the motor.

* * * * *

UNITED STATES PATENT AND TRADEMARK OFFICE
CERTIFICATE OF CORRECTION

PATENT NO.        : 6,911,799 B2
APPLICATION NO.   : 10/423221
DATED             : June 28, 2005
INVENTOR(S)       : Roy J. Jensen It is certified that error appears in the above-identified patent and that said Letters Patent is hereby corrected as shown below:

Claim 4, Line 36 Col. 6: Insert

--...relay to generate a signal to control the motor--.

Signed and Sealed this

Twentieth Day of May, 2008

JON W. DUDAS
*Director of the United States Patent and Trademark Office*